Feb. 8, 1949.　　　J. A. KRATZ ET AL　　　2,460,990
AUTOMATIC ELECTRIC FUSION WELDING
APPARATUS AND PROCESS
Filed Feb. 5, 1946
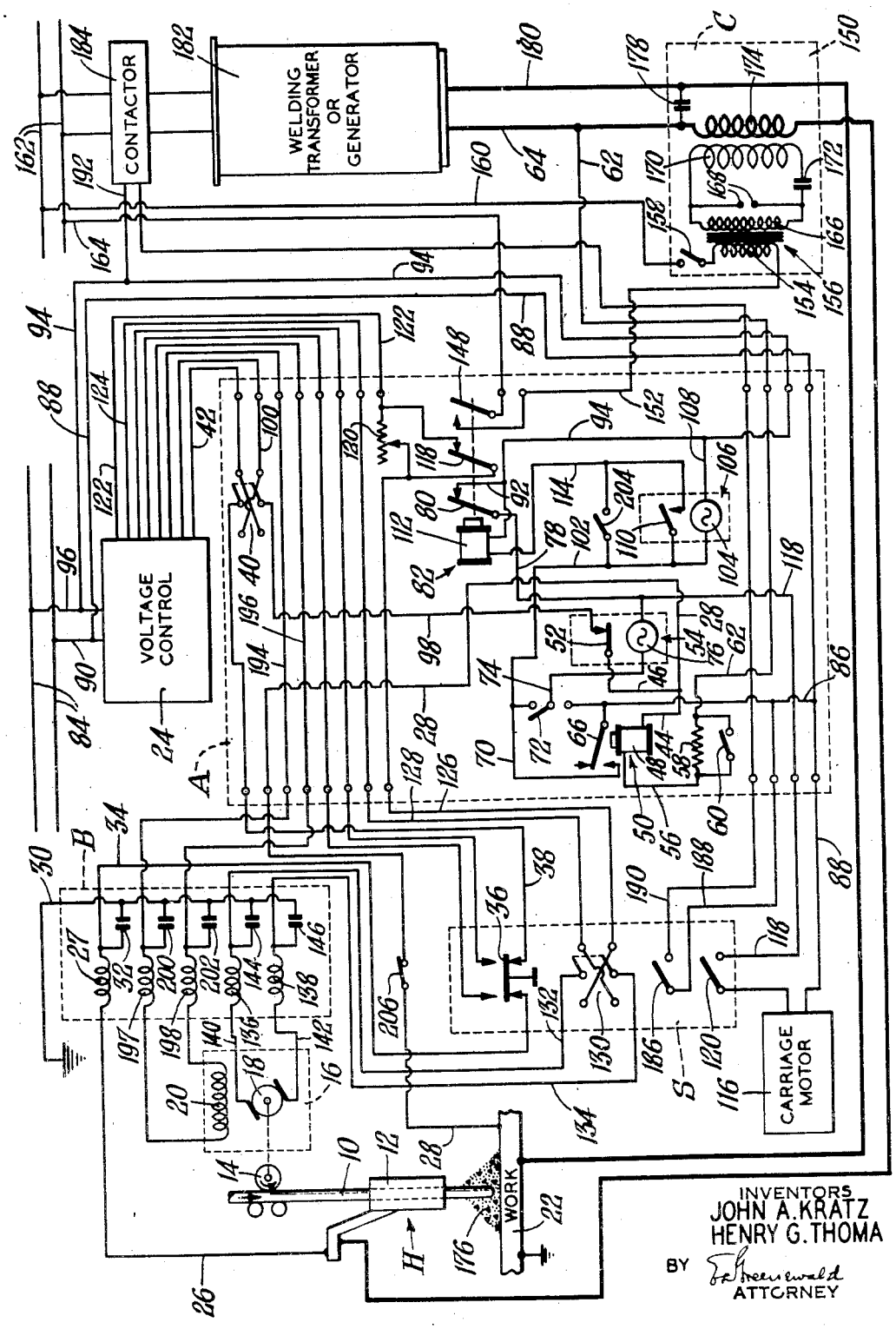
INVENTORS
JOHN A. KRATZ
HENRY G. THOMA
BY　*Greenewald*
ATTORNEY Patented Feb. 8, 1949

2,460,990

UNITED STATES PATENT OFFICE 2,460,990

AUTOMATIC ELECTRIC FUSION WELDING APPARATUS AND PROCESS

John A. Kratz, Yonkers, N. Y., and Henry G. Thoma, Rutherford, N. J., assignors to The Linde Air Products Company, a corporation of Ohio Application February 5, 1946, Serial No. 645,648

9 Claims. (Cl. 219—8)

1

This invention relates to electric fusion welding and more particularly an adjustable automatic welding system.

In the use of submerged melt welding for rivet or plug welding or short seam welding, a troublesome problem is involved due to the presence of the special granulated material which is non-conductive when cold. Such material fills the space between the work and the electrode or welding rod, so that automatic starting cannot be accomplished consistently by having the electrode touch the work and then withdraw to establish the arc. Nor is it feasible, in view of the time element, manually to clean such granulated material from the space between the electrode and the work, and insert a starting fuse, at the beginning of each weld in intermittent welding, in order to start each weld. An object of the invention is to solve such problem.

Such problem is solved according to the invention by novel automatic means for discharging a high-frequency potential through the medium between the electrode and work for a short time only prior to the start of each weld. Advantages result in that the high-frequency generator is active only during a small fraction of the welding cycle, greatly increasing the life of such generator, and considerably reducing the time of possible interference due to the high-frequency output thereof.

Another important object of the invention is to provide improved means to prevent damage to the welding machine and circuit elements and components associated with the system due to the high frequency, even during the short time that the high-frequency generator is in operation.

The primary purpose of the invention is to provide an entirely automatic electric fusion welding system for generating and applying a high-frequency potential between the work and welding electrode while slowly feeding such electrode toward the work, discontinuing the generation of such high-frequency potential and starting relative motion between the electrode and work when the welding operation starts, carrying out such welding operation for a desired period which is adjustable, stopping the welding operation without discontinuing the relative motion between the electrode and work for a desired preset interval which is also adjustable, and automatically repeating the cycle beginning with the high-frequency potential generation.

The single figure of drawing is a diagram of a circuit for use in the invention.

Referring to the drawing, a welding head H

2 is provided in which a metal welding electrode 10, such as a length of wire or rod, is arranged to be fed through an electrical jaw contact 12 by a rod feed roll 14. The roll 14 is driven by a rod feed motor 16 comprising an armature 18 and a separately excited field winding 20. The electrode 10 is fed toward another electrode such as the work 22 to be welded, by the motor 16 at a rate such that the normal welding voltage between the electrode and the work is kept substantially constant by means of an automatic welding voltage control 24, such as that disclosed by Patent 2,260,510.

The input circuit of the welding voltage control includes leads 26 and 28 connected to the contact 12 and work 22, respectively. The lead 26 is connected to one side of a high-frequency choke coil or reactance 27 the other side of which is connected to a grounded conductor 30 through a high-frequency by-pass condenser 32. The condenser and choke are contained in a high-frequency filter unit B. The latter side of the choke coil is also connected by a conductor 34 to one terminal of an "inching" switch 36 in a switch box S, the opposite terminal of switch 36 being connected by a conductor 38 to a double-pole double-throw reversing switch 40 in a timing and control unit A, thence to the voltage control 24 by conductor 42.

The other lead 28 is connected to conductors 44 and 46 leading to the input circuit 48 of a welding voltage-responsive relay 50, and the normally closed output circuit 52 of a welding time-delay relay 54. The input circuit 48 of relay 50 is connected by a conductor 56 to one side of a resistor 58 provided with a shunt switch 60. The switch 60 is closed when welding with alternating current, and opened when welding with direct current. The other side of the resistor 58 is connected by conductor 62 to the "electrode" lead 64 of the welding circuit. The output circuit of relay 50 includes a single-pole double-throw contactor 66 which closes the output circuit at an applied maximum voltage, for example, of about 70 volts, to the input circuit 48; and opens when the applied voltage drops below a minimum value, for example, of about 60 volts. Thus, the relay 50 is responsive to the voltage between the work 22 and electrode 10, automatically opening its output circuit when the welding circuit is open, and closing such output circuit when the welding circuit is closed.

The output circuit of relay 50 includes, in addition to contactor 66, a conductor 70, switch 72, a conductor 74, input circuit 76 of time-delay relay 54, conductor 78 and a normally closed contactor 80 of a starting relay 82. The contactors 66 and 80 are connected to a substantially constant-voltage power supply circuit 84 by conductors 86, 88 and 90; and conductors 92, 94 and 96; respectively. Thus, when the contactors 66 and 80 are closed, the time-delay relay 54 is energized. Since such relay controls the welding interval when it is energized, it may be called the welding time-delay relay. The input circuit 76 of the relay 54 may be shunted around the contactor 66 of the relay 50, by moving the switch 72 from circuit relation with conductor 70 and into circuit relation with conductor 86. By opening the switch 72, the input circuit 76 of the relay 54 may be disconnected from both of the conductors 70 and 86. Normally, however, the switch 72 is closed in circuit relation with the conductor 86.

The output circuit of the welding time-delay relay 54 includes, in addition to the normally closed contactor 52, a conductor 98, switch 40 and conductor 100 of the welding voltage input circuit of the automatic voltage control 24. When the contactor 52 is open, the input control voltage is zero, so that no rod-feed takes place.

The output circuit of the relay 48 also includes a conductor 102, the input circuit 104 of a non-welding time-delay relay 106, and conductor 108 which is connected to the power supply lead 94. Thus, when the contactor 66 closes, the relay 106 is energized, closing a normally open contactor 110 in series with conductor 102, and the input circuit 112 of relay 82 by way of conductor 114, at the end of a predetermined time interval, which is adjustable. When the contactor 110 closes, the relay 82 is energized by the power supply circuit 84, opening its contactor 80, deenergizing the input circuit 76 of relay 54.

The contactor 80 is also in control circuit relation with a carriage driving motor 116 by way of the conductor 78, conductor 118, and, a series switch 120, the other terminal of the motor being connected to the power supply lead 88. Thus, opening of contactor 80, deenergizes motor 216, when the switch 120 is closed. The motor 116 is connected to drive the work 22 or the welding electrode 10 in the direction of the welding seam during a seam welding operation. For example, the rod feed motor 16 and the contact 12 may be mounted on a suitable carriage which is driven by the motor 116 with respect to the work 22 along a desired path. Or, the motor 116 may drive the work 22 with respect to a stationary welding head on which the contact 12 and rod-feed motor are mounted.

In addition to the normally closed contactor 80, the relay 82 is provided with another normally closed contactor 118 in shunt circuit relation with an adjustable resistor 120, the latter being in series with the output circuit of the voltage control 28 which includes the armature 18 of the rod-feed motor 16. Thus, the opening of contactor 118, causes the resistor 120 to function in such circuit to reduce the speed of the armature 18, and hence that of the rod feed. The circuit involved includes conductors 122, 124 from the voltage control 24, conductors 126, 128, a reversing switch 130, conductors 132, 134, high-frequency choke coils 136, 138, and armature leads 140, 142. High-frequency by-pass condensers 144, 146 are provided between the conductors 132, 134 and the ground connection 30.

The relay 82 is also provided with a normally open contactor 148 in the power supply circuit of a high-frequency generator 150, which circuit includes conductor 152, primary winding 154 of a transformer 156, a series switch 158, conductor 160 a substantially constant-voltage power supply circuit 162, and conductor 164. Thus, power is supplied to the generator 156 only when the contactor 148 and switch 158 are closed.

The high-frequency generator 150 also comprises a high-voltage secondary winding 166 of the transformer 156, connected to spaced electrodes 168 of a spark-gap, and to a circuit including an inductance 170 and a capacitance 172, tuned to provide a high-frequency generating output when the transformer 156 is energized. The inductance 170 is coupled to an air-core coil 174 in the welding circuit lead 64, so that the high-frequency output of the generator 150 is applied to the medium 176 between the work 22 and welding rod 10 before the latter touches such work. A high-frequency by-pass condenser 178 is connected between the welding lead 64, and a welding lead 180 which is connected to the work 22.

The leads 64 and 180 are supplied with welding current by a welding transformer or generator 182 which is adapted to be connected to the power supply circuit 162 by suitable circuit means including a normally open contactor 184 which is remotely controlled by a contactor switch 186. When the switch is closed, the control circuit of contactor 184 is energized by the supply circuit 84 through conductor 90, conductor 88, conductor 86, conductor 188, switch 186, conductor 190, contactor 184, conductor 192, conductor 94, and conductor 96.

The voltage control 24 is provided with an output circuit including conductors 194, 196 which are connected to the rod-feed motor winding 20 through high-frequency choke coils 197, 198. The terminals of the latter away from the winding 20 are grounded through high-frequency by-pass condensers 200, 202, and conductor 30.

The medium 176 is a granulated composition which is a non-conductor of the welding current when cold. Therefore, in starting the welding action means is provided to conduct the welding current through such medium between the end of the rod 10 and the work 22 to start the welding action. If the rod 10 is allowed to touch the work 22, such contact may sometimes cause a small amount of metal to fuse and freeze the rod to the plate, resulting in an undesirable short circuit.

Prior to the invention, the usual method of starting the weld was to place a small wad of steel wool between the end of the rod and the work. The steel wool, being a conductor, carried the welding current just long enough to establish conditions for starting the weld; it then melted and became part of the weld. Such method was satisfactory where the time consumed in placing the ball of steel wool was short in comparison to the time of welding. However, in cases such as plug welding, intermittent welding, or production-line welding where there are numerous short welds, the reduction of starting time to a minimum is highly desirable. In such cases, the high-frequency method of starting according to the present invention has proven to be very successful.

The high-frequency apparatus of the invention consists of three main parts: the timing and starting control A, the high-frequency filtering unit B, and the high-voltage, high-frequency generating unit C. The high-frequency generating unit C contains the stepup transformer 156, spark gap, and condenser 172, which develop a high-potential radio frequency output. The unit C is connected in series with the main welding current cables 64, 180 so placed that one side of the high-frequency potential circuit is connected to the electrode 10 and the other side to the ground through the by-pass condenser 178. Sufficient voltage is produced to cause a spark to jump a certain distance such as a $\frac{1}{16}$-in. gap between the electrode 10 and ground. The spark is not affected by the welding composition 176, and creates an ionized path through which the main welding current can flow. Because of its high-frequency, the high potential imposed on the apparatus will not, by itself, cause more than a slight tingling sensation if contact is accidentally made with it by a person.

Since the high-potential current seeks the path of least resistance to the ground and will jump an air gap up to $\frac{1}{16}$ in., for example, it is important that all parts which are at the high potential, or to which the high-potential may jump, be well insulated from the ground. The insulation used in standard welding heads is not sufficient to withstand such high voltage, so special precautions are provided. If the starting unit is used in conjunction with the head and carriage assembly, shown by Patent 2,182,575, the mounting bracket, should be mounted on an insulating base not directly on the carriage. The complete assembly above the mounting bracket, except the switch box S can then be considered to be at the high potential. If the head H is mounted on a special support, a heavy insulating piece should be inserted between the support and the welding head assembly. Generally the insulation is inserted between the support and the mounting bracket or the arm and hinge, if only the latter is used. The rod reel, if mounted separately, must also be insulated. The control cable head connector should always be attached to a grounded part of the equipment.

In addition to insulating the welding equipment, it is also necessary to prevent the high-frequency current from flowing to the ground through the head connector control leads, plugs, and control box. Although the two welding-voltage leads 26, 28 are the only ones connected directly across the high-potential source, the radio frequency current will induce other currents in adjacent leads. Since this might seriously affect the control unit, it is necessary to filter out the high frequency from all the leads from the head without affecting the 60-cycle or direct welding current which normally flows through them. Since the resistance to flow of an alternating current through an inductance varies directly with the frequency, and the resistance to flow through a capacitance varies inversely with the frequency, the small choke coils are each placed in series with each lead from the head. This allows the 60-cycle or direct current to pass through but resists the high-frequency. The choke coils are all contained in the filter unit B. Any small high-frequency currents which pass through the choke coils are by-passed to the ground through the condensers which are connected to ground lead 30.

The control unit A is so designed that it can easily be placed in series with the voltage control leads by removing a plug from its normal connection to the voltage control 24, and inserting it in the 8-pole receptacle contained in the timing unit A. An 8-conductor cable and 8-pole plug supplied with the unit A are then connected to a receptacle in the voltage control 24.

When direct current is used for welding, the polarity of the welding voltage leads to the control unit 24 must be correct or the control unit will not supply current to the rod feed motor 16. Since either straight or reverse polarity may be used for welding, the polarity-reversing switch 40 is provided on the starting control A. The control case should be well grounded; preferably by means of a separate wire from the box to a water pipe or the steel building structure.

The timing and control unit A serves to control, automatically, the operation of the high-frequency starter C and the rate of rod feed at the start of the weld. The starting relay 82 which has two normally closed contacts 80, 118 and one normally open contact 148, controls the actual starting. Resistance 120 in the armature circuit 122 reduces the speed of the rod feed motor 16 during starting. The normally open time-delay relay 106 prevents the apparatus from welding for a preset period of time and is similar to the time-delay relay 54 except that the latter is normally closed, regulates the time of welding. As pointed out above relay 50 is provided with a single-pole, double-throw contact 66 which closes at applied voltage of about 70 volts and opens when the voltage drops below 60 volts. It is connected so as to be responsive to the welding voltage and controls the operation of relay 82 and the two timers 54, 106. Switch 60 should be closed when welding with A. C.; and opened, placing the resistance 58 in series with the relay coil 48, when welding with D. C. Switches 72 and 204 are provided to effectively disconnect time-delay relays 54 and 106, respectively, from the circuit.

The operation of the control can be understood by assuming the need to make intermittent fusion welds 4 inches in length and 6 inches apart at 24 inches per minute, for example. A 4-in. seam weld at 24 inches per minute will take 10 seconds, so the welding time-delay switch 54 is set at the 10-second limit. The space between welds is 6 inches, or 15 seconds at 24 inches per minute; therefore, non-welding time-delay relay 106 is set at the 15-second limit.

The welding carriage supporting the welding equipment is then positioned so that the rod 10 is at a point 6 inches away from where the first intermittent weld is to be made and the contactor and travel switches 186, 120 are closed. The open-circuit voltage across the welding voltage leads 26, 28 immediately causes contact 66 of relay 50 to close, connecting the supply circuit 84 to time-delay relay 106 which starts operating. During this period, contact 52 of time-delay relay 54 is open, preventing the rod 10 from feeding.

At the end of 15 seconds contact 110 of time-delay relay 106 closes and connects the supply circuit 84 to relay 82. Relay 82 then operates and: (1) contact 80 opens the power supply circuit to the travel carriage motor 116 and time-delay relay 54, contact 52 of which returns to its normally closed position and starts the rod feed motor 16; (2) contact 118 cuts resistance 120 into the armature circuit 122 to reduce the rod feed rate; (3) contact 148 starts the high-frequency generating unit C.

As soon as the welding action begins, the open-circuit voltage in circuit 64, 180 drops to the normal welding voltage, causing relay 50 to open and disconnect starting relay 82 from the supply circuit 84. Then in reverse manner, relay 82 will cut out the high-frequency starter C, eliminate the effect of resistance 120 from the armature circuit 122, and start the carriage travel motor 16 and time-delay relay 54. Relay 50 also disconnects time-delay relay 106 so that it returns to its starting position. After the welding operation has proceeded for 10 seconds, time-delay relay contact 52 opens and disconnects the welding-voltage circuit 26, 98, which stops the rod feed motor 16. As the end of the rod 10 burns off, the welding voltage increases until the open-circuit value is reached, and the complete cycle is then automatically repeated.

It should be noted that during the welding "off" time of the cycle the welding head is at open-circuit potential. Resistance 120 should be adjusted so that the rod feed on starting is as fast as possible without causing the rod 10 to stick. If the rod freezes occasionally, more resistance should be added to the circuit.

There are a number of cases where one or both of the time-delay devices 54, 106 are not required. When making plug welds, for example, time-delay relay 106 is not needed. This relay can be effectively shunted from the circuit by closing switch 204. The starter 82 will then function as soon as the contactor switch 186 is manually closed, and the welding will continue automatically until contact 52 of welding time-delay relay 54 opens. The cycle will be repeated immediately, unless the contactor switch 186 is manually opened. When it is desired to provide a delay before welding, but no limit on the time of welding, switch 204 is opened and switch 72 is moved into circuit relation with circuit 70. With this arrangement, the timer 54 is adjusted to a delay of less than one second so that its contact 52 opens immediately after relay 50 operates and thus prevents the rod 10 from feeding until timer 106 closes and starts the welding operation.

In cases that do not require highly accurate timing devices, the welding period may be controlled by a mechanical trip switch operating on a cam mechanism by virtue of the relative travel of the head H and work 22. A single-pole, single-throw trip switch 206, for example, may be placed in series with the welding-voltage lead 26 or ground lead 28. By closing and opening the welding-voltage circuit 26, 28, the trip switch thus controls the operation of voltage-relay 50 and the voltage control 24 in the same way as previously described for the time-delay relays 54, and 106.

The invention is especially suitable for automatic production welding, and intermittent welding, as well as plug welding.

What is claimed is:

1. In an electric fusion welding system comprising a welding-voltage responsive circuit for controlling the welding rod feed in the welding circuit so that the welding voltage is kept substantially constant during welding, an automatic high-frequency starting and timing control combination comprising a voltage-responsive relay operatively associated with said welding circuit so that such relay is responsive to the open-circuit and normal welding voltage differential, a starting relay and a pair of time-delay relays responsive to the operation of said voltage-responsive relay and operatively associated with each other so that one of said time-delay relays is operative as a non-welding timer when open welding-circuit voltage is applied to said voltage-responsive relay, and the other time-delay relay is operative as a welding timer when normal welding voltage is applied to the starting relay, said welding time-delay relay having an output circuit operatively associated with said welding-voltage responsive circuit; said starting relay being responsive to the operation of said non-welding time-delay relay at the end of each non-welding interval for deenergizing said welding time-delay relay and causing the rod feed to start at slow speed, a high-frequency generator responsive to the operation of said starting relay, the output circuit of said generator being coupled to the welding circuit so that the high-frequency output starts the welding current flow before the welding rod touches the work, causing normal welding voltage to be applied to said voltage-responsive relay, deenergizing said non-welding time-delay relay and said starting relay, thereby deenergizing said high-frequency generator, and energizing said welding time-delay relay to start the welding period which continues until the welding time-delay relay stops, opening the welding-voltage responsive circuit, which stops the rod feed.

2. In an automatic electric fusion welding system, the combination comprising a high-frequency generator, means for slowly feeding one welding electrode toward another welding electrode, means for applying the high-frequency output of said generator to said electrodes, means for energizing said high-frequency generator while said electrode is being slowly fed by said electrode-feed means, means for supplying said electrodes with a welding current before said electrodes meet by virtue of the action of such high-frequency output in the medium between said electrodes, and means responsive to the flow of such welding current, for deenergizing said high-frequency generator and increasing the electrode-feed rate of said electrode-feed means.

3. In an automatic relay system, the combination comprising a voltage-responsive relay having a contact which closes when the voltage applied to the input circuit of the relay reaches a maximum value, and opens when such voltage drops below a minimum value, a pair of time-delay relays operatively associated with said contact, one of said time-delay relays having a normally open contact and the other a normally closed contact, a fourth relay having an input circuit controlled by said normally open contact, said fourth relay having three contacts, one of said three contacts being normally closed and in the input circuit of the normally closed-contact time-delay relay, another contact of said three contacts also being normally closed, and the remaining contact of said three contacts being normally open.

4. In a submerged-melt electric fusion welding system, the combination with a welding head including means comprising a rod feed motor for feeding a metal welding rod toward the work, an automatic voltage control for regulating the speed of said motor so as to keep the welding voltage substantially constant, and a high-frequency generator for starting the welding action before the rod touches the work under a blanket of granulated material which when cold is a non-conductor of the welding current, of a high-frequency starting and timing control operatively associated with the system for energizing said generator only at the start of each weld, comprising a relay having an output circuit controlling the operation of said generator, and circuit means responsive to the voltage between said rod and the work for operating said relay so that prior to the start of each weld as the rod approaches the work, the open-circuit voltage of the welding circuit results in the operation of said generator the high-frequency output of which is applied to the rod and work so as to pass through such granulated material until the welding current starts to flow, causing the resulting welding voltage to affect said circuit means and relay so as to deenergize said high-frequency generator as soon as the welding action starts, said relay also having an output circuit operatively associated with said voltage control so that the rate of the rod feed is reduced when said high-frequency generator is operating.

5. In an electric fusion welding system, the combination comprising a welding head, an automatic voltage control, a high-frequency generator having an output circuit coupled to the welding circuit for starting the welding action, a high-frequency starting and timing control for restricting the operation of said high-frequency generator to a short interval prior to the start of each weld, and means for preventing damage to the system due to the high-frequency output of said generator, comprising a high-frequency filter unit located in the circuits between the welding head and the high-frequency starting and timing control, each circuit containing a high-frequency choke coil, and a grounded high-frequency by-pass condenser.

6. An automatic starting and timing control apparatus for an electric fusion welding system in which a metal welding electrode is fed toward the work by means including an automatic voltage control circuit, said apparatus comprising a voltage relay responsive to the open-circuit voltage of the welding circuit, a non-welding time-delay relay controlled by said voltage relay, a starting relay controlled by said non-welding time-delay relay, and a welding time-delay relay controlled by said starting relay, said welding time-delay relay controlling the output of said automatic voltage control circuit so as to stop the electrode feed at the end of each weld, whereby the end of the electrode melts and the resulting open-circuit voltage operates said voltage relay which energizes said non-welding time-delay relay, so that the latter operates said starting relay at the end of each non-welding period, which in turn causes the welding time-delay relay to return the rod feeding function to said voltage control circuit, said starting relay being provided with means associated with said voltage control circuit for restricting the rate at which the rod is fed toward the work immediately prior to the starting of the welding action, and said starting relay also being provided with means for controlling the ionization of the medium between the electrode and the work so that the welding action starts before the electrode actually touches the work.

7. The combination with a submerged-melt electric seam welding machine including carriage means supporting a welding electrode for movement along the seam, means for driving said carriage means, means for feeding said electrode toward such seam as the weld progresses, welding circuit means electrically connecting said electrode to a source of welding current, and means having an input circuit responsive to the welding voltage for energizing said rod feeding means to keep such voltage substantially constant, of means for automatically starting the welding action of such machine at a predetermined point in the path of travel of said carriage means, comprising means acting to render said input circuit effective at such point, and relay means responsive to the open-circuit voltage of the welding circuit acting to deenergize the carriage driving means until the welding action starts, and means operative only while said carriage means is stationary for starting the welding action, said relay means being operative in response to the normal welding voltage to again energize said carriage driving means.

8. An automatic electric fusion welding process involving high-frequency starting and automatic timing, which is especially suitable for plug welding, intermittent welding, and production line welding, which comprises generating and applying a high-frequency potential between the work and a welding electrode connected to a welding current source while slowly feeding such electrode toward the work, automatically discontinuing the generation of such high-frequency potential and starting relative traverse motion between the electrode and work as soon as the welding voltage drops when the welding operation starts, carrying out such welding operation for a desired period of time, stopping the welding operation without discontinuing the relative traverse motion between the electrode and work for a desired interval, and automatically repeating the cycle beginning with the high-frequency potential generation.

9. A submerged-melt electric plug welding process, which comprises feeding a welding rod at a relatively slow rate into a mass of non-conductive granular material toward a plug weld site on the work, applying a high-frequency starting potential and a potential from a welding current source between said rod and the work to start the welding action, and automatically increasing the rod feeding rate and discontinuing the generation of such high-frequency current as soon as the welding potential drops when such welding action starts.

JOHN A. KRATZ.
HENRY G. THOMA.

REFERENCES CITED

The following references are of record in the file of this patent:

UNITED STATES PATENTS

| Number | Name | Date |
| --- | --- | --- |
| 1,146,926 | Conrad | July 20, 1915 |
| 1,701,372 | Jefts | Feb. 4, 1929 |
| 2,152,785 | Blaukenhuehler | Apr. 4, 1939 |
| 2,340,093 | White | Jan. 25, 1944 |
| 2,365,612 | White | Dec. 19, 1944 |